United States Patent
Tomita et al.

(10) Patent No.: US 10,228,806 B2
(45) Date of Patent: Mar. 12, 2019

(54) FLEXIBLE TOUCH SENSOR AND METHOD OF MANUFACTURING THE SAME

(71) Applicant: Panasonic Intellectual Property Management Co., Ltd., Osaka (JP)

(72) Inventors: Yoshihiro Tomita, Osaka (JP); Koji Kawakita, Nara (JP); Koichi Hirano, Osaka (JP); Masanori Nomura, Osaka (JP); Susumu Sawada, Osaka (JP); Takashi Ichiryu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 59 days.

(21) Appl. No.: 15/481,974

(22) Filed: Apr. 7, 2017

(65) Prior Publication Data

US 2017/0300147 A1 Oct. 19, 2017

(30) Foreign Application Priority Data

Apr. 15, 2016 (JP) .................. 2016-082336

(51) Int. Cl.
| | |
|---|---|
| *G06F 3/044* | (2006.01) |
| *G01L 1/20* | (2006.01) |
| *G06F 3/045* | (2006.01) |
| *G06F 3/047* | (2006.01) |

(52) U.S. Cl.
CPC .............. *G06F 3/044* (2013.01); *G01L 1/205* (2013.01); *G06F 3/045* (2013.01); *G06F 3/047* (2013.01); *G06F 2203/04102* (2013.01); *G06F 2203/04103* (2013.01)

(58) Field of Classification Search
CPC ........................................... G06F 3/044
See application file for complete search history.

(56) References Cited

U.S. PATENT DOCUMENTS

| | | | |
|---|---|---|---|
| 4,659,873 A | 4/1987 | Gibson et al. | |
| 6,522,322 B1 | 2/2003 | Maeda et al. | |
| 2006/0060394 A1* | 3/2006 | Hayakawa | A43B 7/36 180/8.5 |
| 2012/0091990 A1 | 4/2012 | Tsukada et al. | |

FOREIGN PATENT DOCUMENTS

| | | |
|---|---|---|
| JP | 61-021522 A | 1/1986 |
| JP | 62-63332 A | 3/1987 |
| JP | 10-144168 A | 5/1998 |
| JP | 2000-284913 A | 10/2000 |
| JP | 2003-500758 A | 1/2003 |
| JP | 2006-284276 A | 10/2006 |
| JP | 2011-102457 A | 5/2011 |
| JP | 2012-043054 A | 3/2012 |
| JP | 2012-109221 A | 6/2012 |
| JP | 2013-016069 A | 1/2013 |
| JP | 2013-064681 A | 4/2013 |
| JP | 2013-147765 A | 8/2013 |
| WO | WO 00/72239 A1 | 11/2000 |

* cited by examiner

*Primary Examiner* — Jermele M Hollington
*Assistant Examiner* — Feba Pothen
(74) *Attorney, Agent, or Firm* — Renner Otto Boisselle & Sklar, LLP (57) ABSTRACT

A flexible touch sensor comprises: a first sheet material that has a first major surface, and that has a cushioning property; a second sheet material that includes a conductive material, and that is disposed on the first major surface of the first sheet material; and a conductive wire that is disposed on the first major surface of the first sheet material, and that is sunk into the first sheet material.

18 Claims, 9 Drawing Sheets

FLEXIBLE TOUCH SENSOR AND METHOD OF MANUFACTURING THE SAME

BACKGROUND

1. Technical Field

The present disclosure relates to a touch sensor exhibiting flexible characteristics and a method of manufacturing the touch sensor.

2. Description of the Related Art

In general, a touch sensor is used in a smartphone and a tablet computer or the like, and provides an interface familiar with users.

In recent years, touch sensors are becoming more familiar and mounting of a touch sensor to a wearable device, which is attached to a human body and used, has been studied. Specifically, touch sensors are being used for the application of wearing on a human body or close attachment to a human body. A wearable device provided with such a touch sensor has a function of sensing, for instance, vital information on human body, and thus contributes to the establishment of a new service such as health care (see, for example, Japanese Unexamined Patent Application Publication Nos. 61-21522, 2013-16069, 2011-102457, 62-63332, and 2012-109221 and Japanese Unexamined Patent Application Publication (Translation of PCT Application) No. 2003-500758).

SUMMARY

Thus, the present disclosure provides a flexible touch sensor.

In one general aspect, the techniques disclosed herein feature a flexible touch sensor according to an embodiment of the present disclosure includes: a first sheet material that has a first major surface, and that has a cushioning property; a second sheet material that includes a conductive material, and that is disposed on the first major surface of the first sheet material; and a conductive wire that is disposed on the first major surface of the first sheet material, and that is sunk into the first sheet material.

The sensor of the present disclosure is a flexible touch sensor.

It should be noted that general or specific embodiments may be implemented as a sensor, a device, an apparatus, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

First, preliminary idea of the inventors for devising a flexible touch sensor of the present disclosure will be described. For the application of a wearable device, it is called for that a touch sensor serving as a user interface be properly fitted to a human body (particularly, the curved surface of a human body). In addition, even for the application in which an interface is incorporated into a curved surface of an object, a touch sensor fitted to such a curved surface is called for. As a conventional touch sensor, a "flat plate sensor" is generally known. Such a touch sensor has a configuration in which two rigid plate-like sheets each provided with a resistance film are disposed to face each other. When the touch sensor is pressed, electrical conduction occurs between the two resistance films, and a depressed position is detected. However, usually, such a conventional touch sensor cannot be used in a bent state due to the rigid sheet, and thus is not necessarily properly fitted to the surface of a human body or a curved surface of an object. The inventors have studied the possibility of replacing a sensor sheet included in a conventional touch sensor with a flexible material, and have found a problem that simple replacement of a sensor sheet included in a conventional touch sensor with a flexible material is not sufficient to achieve a flexible touch sensor.

A touch sensor has a structure in which two sensor sheets each provided with a conductive pattern are disposed to face each other. Normally, the conductive patterns of the two sensor sheets are properly separated because accidental contact of the conductive patterns of the two sensor sheets causes false recognition of a depressed position or malfunction. To achieve such separation, a spacer is normally provided between the two sensor sheets. Like this, in a conventional touch sensor including a spacer, when the touch sensor is pressed, the conductive patterns of the two sensor sheets come into contact with each other at a portion where no spacer is provided, and sensing is performed.

However, use of a flexible material for the sensor sheets to impart flexible property to the touch sensor may cause undesired events because when the touch sensor is deformed, the sheet material is also deformed. Specifically, although no touch operation is performed by a user, conductive contact between the two sensor sheets is caused at a portion where no spacer is provided just by overall deformation of the touch sensor, and thus false recognition or malfunction may occur.

The inventors have intensively studied to solve the above-mentioned problem. As a result, the inventors have devised a configuration in which a material exhibiting a cushioning property is used as the sheet material for the touch sensor, and the conductive pattern is sunk into the surface of the sheet material. Thus, in a state where the touch sensor is not pressed, almost no conductive contact occurs between the sensor sheets facing each other regardless of any deformation of the touch sensor, and only when the touch sensor is intentionally pressed, the sheet material is depressed and conductive contact is made. Consequently, a flexible touch sensor is achieved such that even when the sheet is overall deformed, no false recognition or malfunction occurs.

Hereinafter, a flexible touch sensor according to an embodiment will be described. The various elements in the drawings are merely illustrated schematically for the sake of understanding the present disclosure, and a dimensional ratio, an external appearance may be different from the actual ones.

[Flexible Touch Sensor according to Present Disclosure]

Figure 1A:
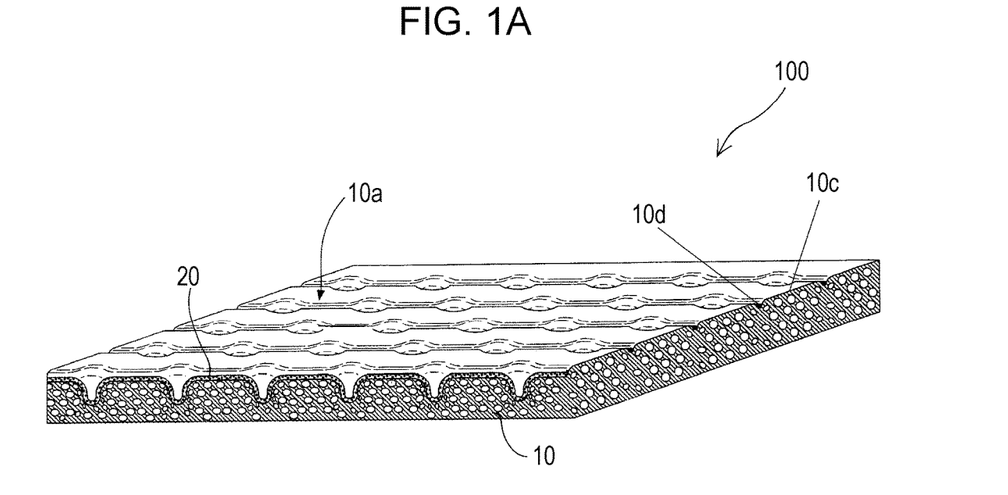
FIG. 1A is a sectional perspective view schematically illustrating the configuration of a flexible touch sensor according to an embodiment of the present disclosure.
Figure 1B:
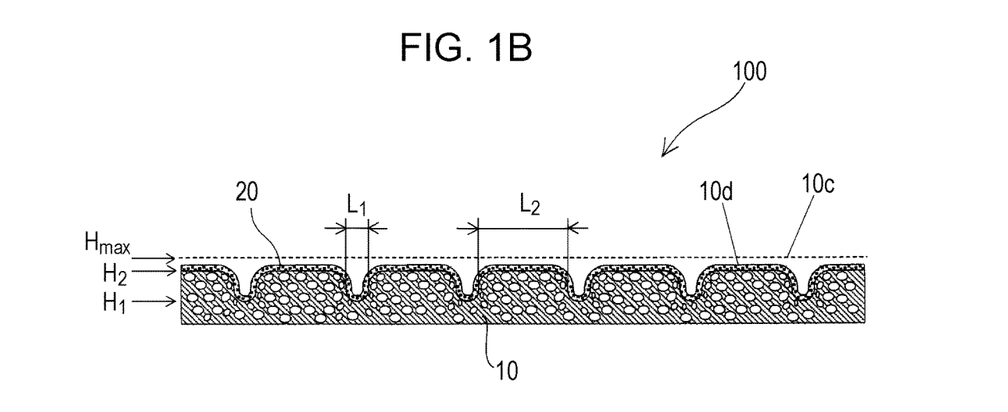
FIG. 1B is a sectional view schematically illustrating the configuration of the flexible touch sensor according to the embodiment of the present disclosure.

The configuration of a flexible touch sensor 100 according to an embodiment is illustrated in FIGS. 1A and 1B. As illustrated, the flexible touch sensor 100 includes at least a cushioning property sheet material 10 and a conductive wire 20. The conductive wire 20 is provided at the cushioning sheet material 10. Particularly, the conductive wire 20 is provided on a major surface 10a of the cushioning sheet material 10.

As illustrated, the conductive wire 20 as a whole extends in a horizontal direction. More specifically, the conductive wire 20 as a whole extends in a direction perpendicular to the thickness direction of the cushioning sheet material 10.

In the flexible touch sensor 100, the conductive wire 20 provided on the major surface 10a of the cushioning sheet material 10 is sunk into the sheet material 10. This indicates that the conductive wire 20 digs into the major surface 10a of the cushioning sheet material 10. In other words, the conductive wire 20 is depressed inwardly of the cushioning sheet material 10. The sheet material 10 includes a first part 10c where the conductive wire 20 is not disposed, and a second part 10d where the conductive wire 20 is disposed. In the example of FIG. 1A, the second part 10d is a linear part that is depressed along the conductive wire 20, the first part 10c is a bulged part between two adjacent lines of the conductive wire 20. In a state where the flexible touch sensor 100 is not pressed, the second part 10d is more compressed than the first part 10c. Also, in a state where the flexible touch sensor 100 is not pressed, the first part 10c is in contact with the other sheet material described later, and the second part 10d is separated away from the other sheet material.

The sheet material 10 has a "cushioning property" so that the conductive wire 20 is properly sunk into the sheet material 10. It is to be noted that since the conductive wire 20 is provided on the major surface 10a of the cushioning sheet material 10, the conductive wire 20 itself, although being "sunk", can be exposed to the outside. For this reason, when the flexible touch sensor 100 is touched, the conductive wire 20 properly functions as a wire for detecting the touch.

More specifically, in the flexible touch sensor 100, the conductive wire 20 may be disposed at a lower level (a second level that is the height of the surface of the second part 10d) than the highest level $H_{max}$ (a first level that is the height of the surface of the first part 10c) among the height levels of the major surface 10a of the cushioning sheet material 10 (see FIG. 1B). In other words, in the flexible touch sensor 100, the major surface 10a of the cushioning sheet material 10 is not flat due to the "sinking" of the conductive wire 20. It is to be noted that the "height level" is a level of the depression and projection on the surface. The level of a portion bulged in an outward direction is high, and the level of a portion depressed in an inward direction is low.

The major surface area where the conductive wire 20 is present has a relatively low height level due to the "depression" by the conductive wire 20, whereas the major surface area where the conductive wire 20 is not present has a relatively high height level. Particularly, in the major surface area where the conductive wire 20 is present, a portion in contact with the conductive wire 20 has the lowest height level, and the height level of the major surface 10a gradually increases as the distance from the portion increases. In other words, the major surface 10a of the cushioning sheet material 10 has, for instance, a raised form like a ridge. Because of such a form, the flexible touch sensor 100 is configured such that the conductive wire 20 is positioned at a lower level than the highest level $H_{max}$ among the height levels of the major surface 10a of the cushioning sheet material 10.

In an aspect, the conductive wire 20, which is sunk into the major surface 10a of the cushioning sheet material 10, extends in a horizontal direction (longitudinal direction of the conductive wire 20) with the height level periodically changed. Specifically, the flexible touch sensor 100 has a first lower level $H_1$ (a fourth level) and a second lower level $H_2$ (a third level) higher than the first lower level, and the conductive wire extends so that the first lower level $H_1$ and the second lower level $H_2$ are alternately positioned. In other words, "the first lower level $H_1$ which is relatively lower height" and "the second lower level $H_2$ which is relatively higher height" are present as lower levels, and the conductive wire 20 extends so that the first lower level $H_1$ and the second lower level $H_2$ alternately appear (see FIG. 1B).

As illustrated, the overall extending direction of the conductive wire 20 corresponds to a direction perpendicular to the thickness direction of the cushioning sheet material 10. The conductive wire 20 extending with the height level alternately changed is more properly fixed to the cushioning sheet material 10. It is to be noted that extension of the conductive wire 20 with the height level alternately changed may have a predetermined period as illustrated. In addition, when an extension length $L_1$ of the conductive wire 20 at the first lower level $H_1$ is compared with an extension length $L_2$ of the conductive wire 20 at the second lower level $H_2$, the extension length $L_2$ may be relatively longer. In this manner, when the flexible touch sensor 100 is touched, the conductive wire 20 properly functions as a wire for detecting the touch.

Figure 2A:
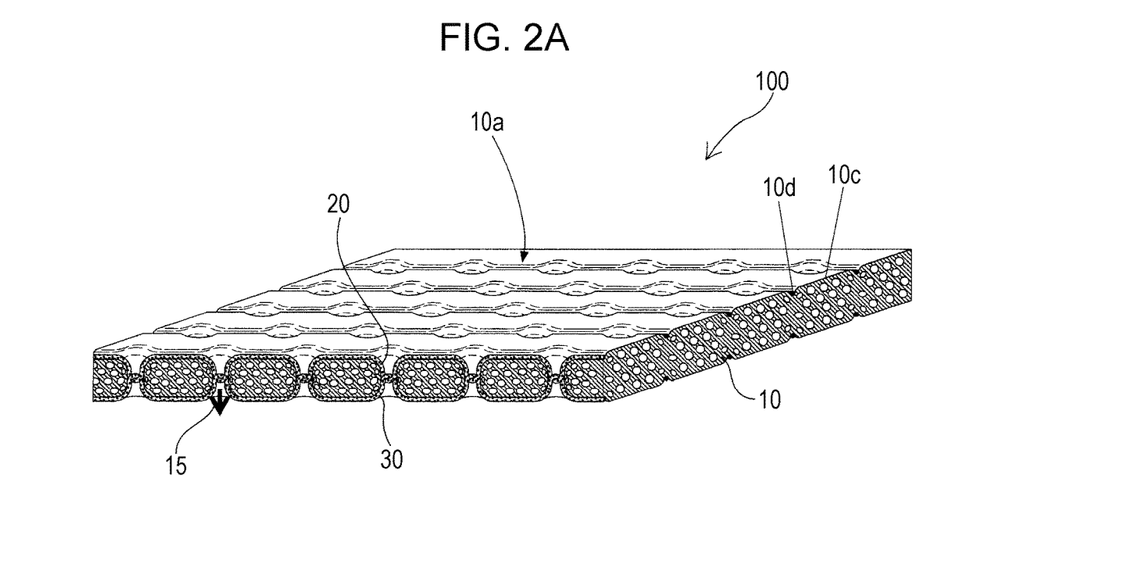
FIG. 2A is a sectional perspective view schematically illustrating the configuration of a flexible touch sensor according to an embodiment of the present disclosure.
Figure 2B:
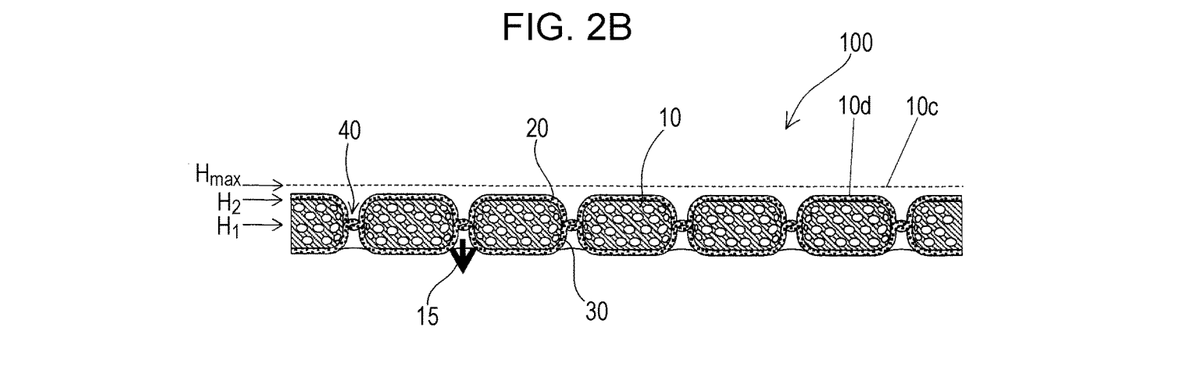
FIG. 2B is a sectional view schematically illustrating the configuration of the flexible touch sensor according to the embodiment of the present disclosure.

In another aspect, the flexible touch sensor 100 further includes a fixing wire 30 for fixing the "sinking" of the conductive wire 20 (see FIGS. 2A and 2B). In such an aspect, as illustrated in FIGS. 2A and 2B, the fixing wire 30 and the conductive wire 20 may be engaged with each other in the cushioning sheet material 10. This is because when the conductive wire 20 is fixed to the cushioning sheet material 10, the conductive wire 20 is pulled and fixed by the fixing wire 30. In other words, in the conductive wire 20, a force (pulling force) 15 in a direction to the center of the cushioning sheet material 10 may be applied by the tension of the fixing wire 30. Due to the "cushioning property" of the cushioning sheet material 10, the conductive wire 20 is likely to have a form of being sunk toward the center of the sheet material 10 by the force 15.

In an aspect in which the fixing wire 30 is provided, the fixing wire 30 and the conductive wire 20 may be engaged at the first lower level $H_1$ (see FIG. 2B). In other words, a contact point 40 between the fixing wire 30 and the conductive wire 20 may be positioned at the first lower level $H_1$ which is relatively lower than the second lower level $H_2$. This is because when the conductive wire 20 is pulled and fixed by the fixing wire 30, the point of application of the force applied to the conductive wire 20 by the fixing wire 30 corresponds to the engagement point of the fixing wire 30 with the conductive wire 20. Thus, the point of application is positioned at the first lower level $H_1$.

As an illustration merely, the engagement of the fixing wire 30 with the conductive wire 20 may be made by what is called "machine sewing". For instance, the conductive wire 20 corresponds to "top thread" of machine sewing, and the fixing wire 30 corresponds to "bobbin thread" of machine sewing, and the flexible touch sensor 100 may have a configuration in which such top thread and bobbin thread are engaged with each other by machine sewing.

Here, each of the cushioning sheet material 10, the conductive wire 20, and the fixing wire 30, which are components of the flexible touch sensor 100, will be described in detail.

The cushioning sheet material 10 is a sheet-like base material having electrical insulation. The cushioning sheet material 10 is a sheet material exhibiting a cushioning property and/or flexibility. That is, a cushioning sheet material used for a flexible touch sensor according to an embodiment is flexible as a whole, and is deformable by a pressing force. Since such deformation is possible, the conductive wire provided on the major surface of the cushioning sheet material is likely to have a form of being sunk into the sheet material. In a typical example, the cushioning sheet material may be such a sheet material that is deformed when a pressing force is applied from the outside and that can eventually return to the original shape when the pressing force is removed.

As seen from the above description, in the present disclosure, the "cushioning property" substantially refers to the property of being deformable according to an external force. The cushioning sheet material used for the flexible touch sensor has such a property of being deformable according to an external force. Also, the cushioning sheet material is a sheet, and thus has a thin form as a whole. Particularly, the "cushioning sheet material" may exhibit not only the "cushioning property" but also "flexibility". In other words, the cushioning sheet material may be bendable as a whole according to an external force. Such characteristics of the sheet material contribute to achievement of a flexible touch sensor that is fitted to the surface of a human body or a curved surface of an object more properly.

In a flexible touch sensor according to an embodiment, the cushioning sheet material 10 may include a sponge material, a fiber cloth material or an elastomer material. For instance, the cushioning sheet material may be a sponge in a sheet form as a whole. As an illustration merely, the sponge material may include a urethane resin material (for instance, a foamed polyurethane resin material), and an acrylic resin material. For instance the cushioning sheet material may be an elastomer sheet, and may be a sheet composed of a rubber (such as a natural rubber, a synthetic rubber) or a thermosetting resin-based elastomer (such as urethane rubber, silicone rubber, fluorocarbon rubber).

Furthermore, the cushioning sheet material 10 may be a fiber cloth, for instance. In other words, the cushioning sheet material may be a sheet member composed of a fiber. What is referred to as a "fiber" here may be a chemical fiber, a natural fiber, or a mixture of those fibers. The chemical fiber may be a synthetic fiber, a semi-synthetic fiber, a recycled fiber, and/or an inorganic fiber. The synthetic fiber includes an aliphatic polyimide-based fiber (for instance, a nylon 6 fiber, a nylon 66 fiber), an aromatic polyimide-based fiber, a polyvinyl alcohol-based fiber (for instance, a vinylon fiber), a polyvinylidene chloride-based fiber, a polyvinyl chloride-based fiber, a polyester-based fiber (for instance, a polyester fiber, a PET fiber, a PBT fiber, a polyarylate fiber), a polyacrylonitrile-based fiber, a polyethylene-based fiber, a polypropylene-based fiber, a polyurethane-based fiber, a phenol-based fiber and a polyfluoroethylene-based fiber. The semi-synthetic fiber includes a cellulose-based fiber and a protein-based fiber. The recycled fiber includes a rayon fiber, a cupra fiber and a lyocell fiber. The inorganic fiber includes a glass fiber, a carbon fiber, a ceramic fiber and a metal fiber. The natural fiber may be a plant fiber, an animal fiber or a mixture of those fibers. The plant fiber includes cotton, hemp (for instance, flax, ramie). The animal fiber includes pelage (for instance, wool, angora, cashmere, mohair), silk and feather (for instance, down, feather). The fiber itself used for a fiber cloth may be a short fiber or a continuous fiber, and further may be a hollow fiber. In addition, the fiber used for a fiber cloth may have a thread form, and may be, for instance, a twisted thread which is obtained by twisting fibers. A fiber or a fiber thread and a twisted thread made of the fiber may have elastic characteristics itself. Regarding the structure and configuration of a fiber cloth, the fiber cloth may be any one of fiber fabric, knit fabric and non-woven fabric. In other words, the fiber cloth may be in a "fabric" form in which what is called warp and woof threads are woven in a cross pattern or may be in a "knit" form in which a thread is knitted so as to be bent. Furthermore, the fiber cloth may be in a "non-woven fabric" form (for instance, a form of a needle punch cloth or a spunbond cloth) which is not woven or knitted.

In an aspect, the cushioning sheet material 10 in the fiber cloth form is a knit fabric. In other words, the cushioning sheet material may have a knit structure. Since the knit fabric may be regarded as an elastic body that is deformed when pulled and returns to the original form when a force is released, the cushioning sheet material exhibits appropriate stretchability in addition to the cushioning property. The knit fabric may have a knit structure, for instance. In a knit cloth having a knit structure, adjacent fiber threads are alternately twisted and knitted, and when a single fiber thread is observed, the single fiber thread is twisted with an adjacent fiber thread while alternately moving in a meandering manner. Since the fiber thread moves in a meandering manner, the fiber thread has a sufficient space for extension against pulling, and a knit structure is generally used for a cloth which needs flexibility and stretchability as represented by a sweater and a jersey or a knitted fabric shirt.

Furthermore, various materials such as a raised fabric, pile material like a carpet or a towel may be used as the cushioning sheet material 10 (thus, the cushioning sheet material may be composed of a cloth having a cushioning property, such as a pile cloth, a towel cloth or a raised fabric cloth). Also, when cotton is inserted between two pieces of cloth are sewn together in a lattice pattern by a thread, like quilting, a structure is created in which a portion without a sewing thread bulges due to the cotton insertion and a portion with a sewing thread is depressed. Thus, such a structure can be used as the cushioning sheet material (in this case, the flexible touch sensor of the present disclosure may be configured by using a conductive wire for part of the sewing thread).

The conductive wire 20 is a wire that exhibits electrical conductivity. The conductive wire 20 is a "wire", and thus has an elongated form as a whole. The conductive wire may have flexibility. Specifically, the conductive wire itself may exhibit characteristics that allow the wire to be bent in a curved shape or bent sharply according to an external force. Thus, the conductive wire is likely to have a form in which the wire extends with the height level alternately changed. More specifically, the conductive wire can be properly extended so that the first lower level $H_1$ and the second lower level $H_2$ are alternately positioned (see FIG. 1B).

The conductive wire 20 may include a metal material or a conductive fiber material. In this case, electrical continuity of the flexible touch sensor can be more properly achieved by the conductive wire. In the case of a metal material, the material of the conductive wire may be at least one selected from a group consisting of gold (Au), silver (Ag), copper (Cu), nickel (Ni), chromium (Cr), cobalt (Co), magnesium (Mg), calcium (Ca), platinum (Pt), molybdenum (Mo), iron (Fe) and zinc (Zn). Even in the case of a conductive fiber material (for instance, a conductive fiber thread), electrical continuity can be achieved by such a fiber thread. The conductive fiber thread may be, for instance, a metal fiber, a plated fiber, a conductive polymer fiber, or a thread which is formed of, composed of or machined from those fibers. For instance, the metal fiber may be a fiber including at least one selected from a group consisting of gold (Au), silver (Ag), copper (Cu), nickel (Ni), chromium (Cr), cobalt (Co), magnesium (Mg), calcium (Ca), platinum (Pt), molybdenum (Mo), iron (Fe) and zinc (Zn). The plated fiber may be a fiber formed by plating a fiber including at least one selected from a group consisting of polymer, carbon, and cotton. It is to be noted that the plated fiber may be in a form of thread. The conductive polymer fiber may be a fiber including a polymer having electrical conductivity. The polymer includes at least one selected from a group consisting of polyacetylene, polyparaphenylene, polyaniline, polythiophene, polyparaphenylene vinylene, and polypyrrole, for instance.

The fixing wire 30 is a wire used for fixing a conductive wire to the cushioning sheet material. In other words, the fixing wire is a wire for fixing the sinking of the conductive wire. Thus, the term "fixing" in the fixing wire in the present description is used in consideration of the relation to the conductive wire.

Similarly to the conductive wire, the fixing wire is a "wire", and thus has an elongated form as a whole. The fixing wire may have flexibility. Specifically, the fixing wire itself may exhibit characteristics that allow the wire to be bent in a curved shape or bent sharply according to an external force. Thus, drawing tension caused by the fixing wire can be properly transmitted to the conductive wire, and the conductive wire is likely to have a form of being sunk into the cushioning sheet material.

The fixing wire may be an insulating wire, for instance. In other words, a conductive wire exhibiting no electrical conductivity particularly may be used as a fixing wire. The drawing tension caused by the fixing wire is likely to be more properly transmitted to the conductive wire. For instance, the material of an insulating wire may be a resin material. As an illustration merely, the material of an insulating wire may be at least one selected from a group including an acrylic resin, a urethane resin, a silicone resin, a fluorine resin, a polyimide resin, and an epoxy resin.

In an aspect, a conductive wire may be used as the fixing wire. In other words, the conductive wire and the fixing wire may be the same type of wire. Thus, the pulling force caused by the fixing wire are likely to be transmitted more properly to the conductive wire, and the conductive wire is likely to have a form of being sunk into the cushioning sheet material (in particular, due to the "same type", the tension balance between the fixing wire and the conductive wire is appropriate, and the conductive wire can be pulled more properly). In the first place, the "same type of wire" leads to reduction of the number of components of the sensor, thereby contributing to achievement of a flexible touch sensor in a simpler configuration.

The flexible touch sensor of the present disclosure may be implemented in various aspects.

For instance, the cushioning sheet material provided with a conductive wire may be used with a separate sheet material. The cushioning sheet material with the conductive wire and the separate sheet material form a pair. The separate sheet material may include at least an insulation base material and a conductor as the components. The conductor in the separate sheet material may be in a form of conductive wire or in another form. When the sheet materials in the pair are stacked and used, conductive contact between the conductive wire of the cushioning sheet material and the conductor of the separate sheet material is made by pressing.

Figure 3:
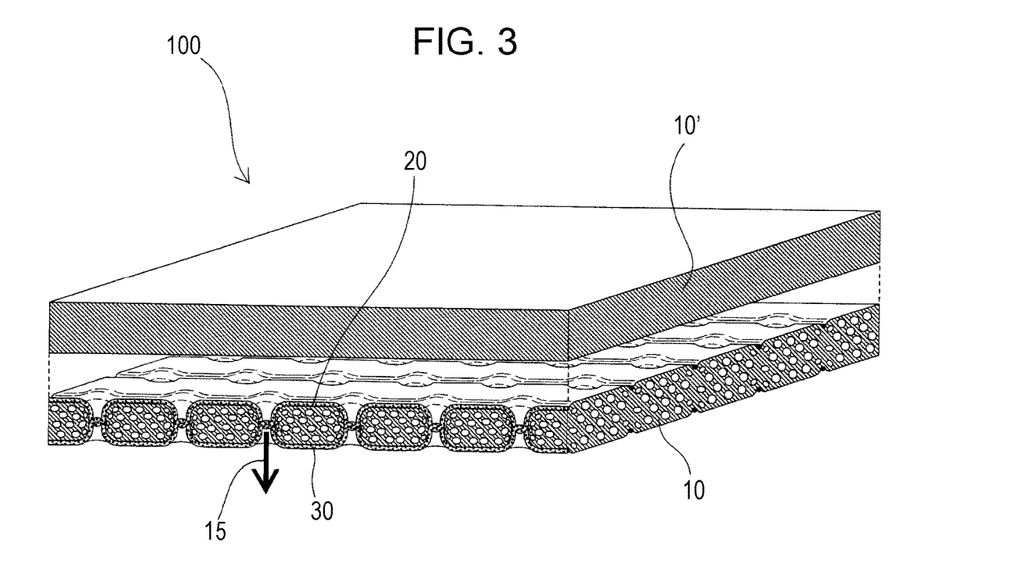
FIG. 3 is a sectional perspective view schematically illustrating the flexible touch sensor according to the embodiment of the present disclosure.
Figure 4:
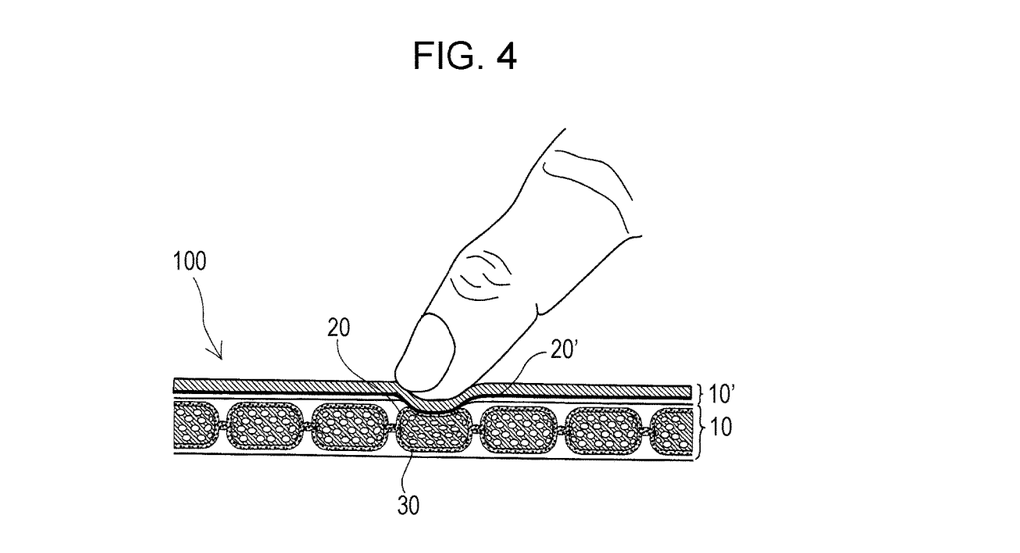
FIG. 4 is a sectional perspective view schematically illustrating the flexible touch sensor according to the embodiment of the present disclosure.

As an illustration merely, the specific configuration of the flexible touch sensor 100 including paired sheet materials is illustrated in FIGS. 3 and 4. In the flexible touch sensor 100, the cushioning sheet material 10 provided with the conductive wire 20 and a separate sheet material 10' paired with the cushioning sheet material 10 are stacked together (it is to be noted that hereinafter the sheet materials are respectively referred to as a "first sensor sheet 10" and a "second sensor sheet 10'"). Although the first sensor sheet 10 and the second sensor sheet 10' are illustrated with a space therebetween in FIG. 3, practically, the flexible touch sensor 100 may have a structure in which the first sensor sheet 10 and the second sensor sheet 10' are stacked to be in an intimate contact state. At least one (the first sensor sheet in the illustrated aspect) of the two sensor sheets may be the "cushioning sheet material 10 provided with the conductive wire 20" mentioned above. Specifically, in the first sensor sheet 10, the fixing wire 30 is provided at predetermined intervals so as to pass through a sheet base material having a cushioning property, for instance, and the conductive wire 20 is fixed to the surface of the sheet base material by the fixing wire 30. As illustrated, the conductive wire 20 and the fixing wire 30 are sewn into the sheet base material by machine sewing using the conductive wire 20 as the top thread and the fixing wire 30 as the bobbin thread. Specifically, the conductive wire 20 and the fixing wire 30 are sewn into the sheet base material under a predetermined tension, and thus a force 15 in an inward direction of the sheet base material is applied to the conductive wire 20, which has a form of being sunk into the surface of the sheet base material. In other words, in the first sensor sheet 10, the conductive wire is disposed at a lower level than the highest level among the height levels of the major surface of the cushioning sheet material 10.

Here, even if the second sensor sheet 10' is a sheet having an entire planar form, the conductive wire 20 in the first sensor sheet 10 paired with the second sensor sheet 10' is in a state of being sunk into the surface of the sheet base material, and thus even when an external force such as bending force is applied to the flexible touch sensor 100, no conductive contact occurs between the conductive wire 20 of the first sensor sheet 10 and the second sensor sheet 10'. In other words, even when the sheet is overall bent, the flexible touch sensor 100 is designed to be unlikely to cause malfunction or false recognition. It is to be noted that with a configuration which is provided with a spacer between the sensor sheets as in related art, a spacer is only partially provided, and thus there is a risk of undesirable contact between the conductive patterns. However, the flexible touch sensor 100 of the present disclosure properly avoids such a risk. This is because, in the flexible touch sensor 100 of the present disclosure, the entire surface of the sheet base material (in short, the cushioning sheet material) anywhere other than the area into which the conductive wire is sunk serves as a spacer, and only the area into which the conductive wire is sunk is apart from the second sensor sheet 10'. Thus, even when the flexible touch sensor 100 is bent, a state of separation of the conductive wire 20 can be properly maintained.

FIG. 4 illustrates a state where the flexible touch sensor 100 is pressed. As illustrated, when the first sensor sheet 10 is pressed by a finger with the second sensor sheet 10' interposed therebetween, a local compression force is applied to the first sensor sheet 10. Thus, the sheet base material surrounding the conductive wire 20 is depressed into the first sensor sheet 10, and the conductive wire 20 appears on the outermost surface level of the sheet base material. Consequently, the conductive wire 20 of the first sensor sheet 10 and a conductive film 20' of the second sensor sheet 10' come into contact with each other. That is, conductive contact is made between the conductive film 20' on the surface of the second sensor sheet 10' and the conductive wire 20 of the first sensor sheet 10, and thus a depressed position is detectable. It is to be noted that as illustrated in FIG. 4, the conductive wire 20 of the first sensor sheet 10 which is not pressed is apart from the conductive film 20' of the second sensor sheet 10', and thus even if the sensor sheet is bent at a portion other than an area into which the sensor sheet is locally depressed, the conductive film 20' of the second sensor sheet 10' and the conductive wire 20 of the first sensor sheet 10 do not come into contact with each other. Consequently, it is possible to achieve highly accurate and stable touch sensing while avoiding malfunction or false recognition.

In the flexible touch sensor 100 of the present disclosure, two similar sheet materials may be used. For instance, a configuration may be adopted in which two pieces of the "cushioning sheet material provided with a conductive wire" are provided and the two cushioning sheet materials are stacked together. That is, the flexible touch sensor 100 of the present disclosure may have a configuration in which two pieces of the "cushioning sheet material 10 into which the conductive wire 20 is sunk" described with reference to FIGS. 1A and 1B and FIGS. 2A and 2B are stacked together. When the two pieces are stacked together, adhesives may be used for the peripheral edges of the sheets, and thereby one sheet material and the other sheet material may be bonded to each other. Alternatively, two sheet materials may be bonded to each other by a technique such as machine sewing.

Figure 5:
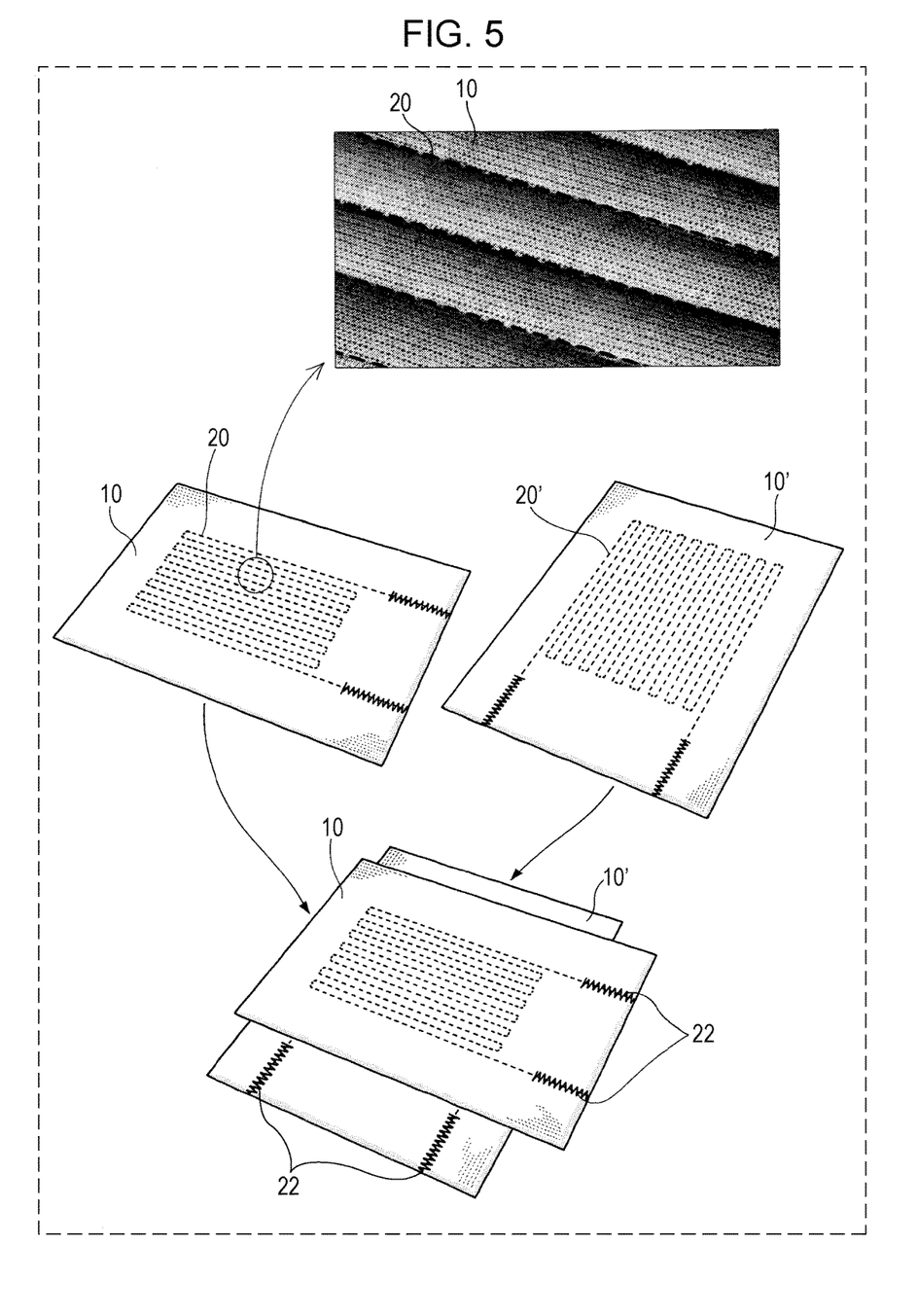
FIG. 5 illustrates a perspective view and an enlarged view of a portion schematically depicting a flexible touch sensor according to an embodiment of the present disclosure.
Figure 6:
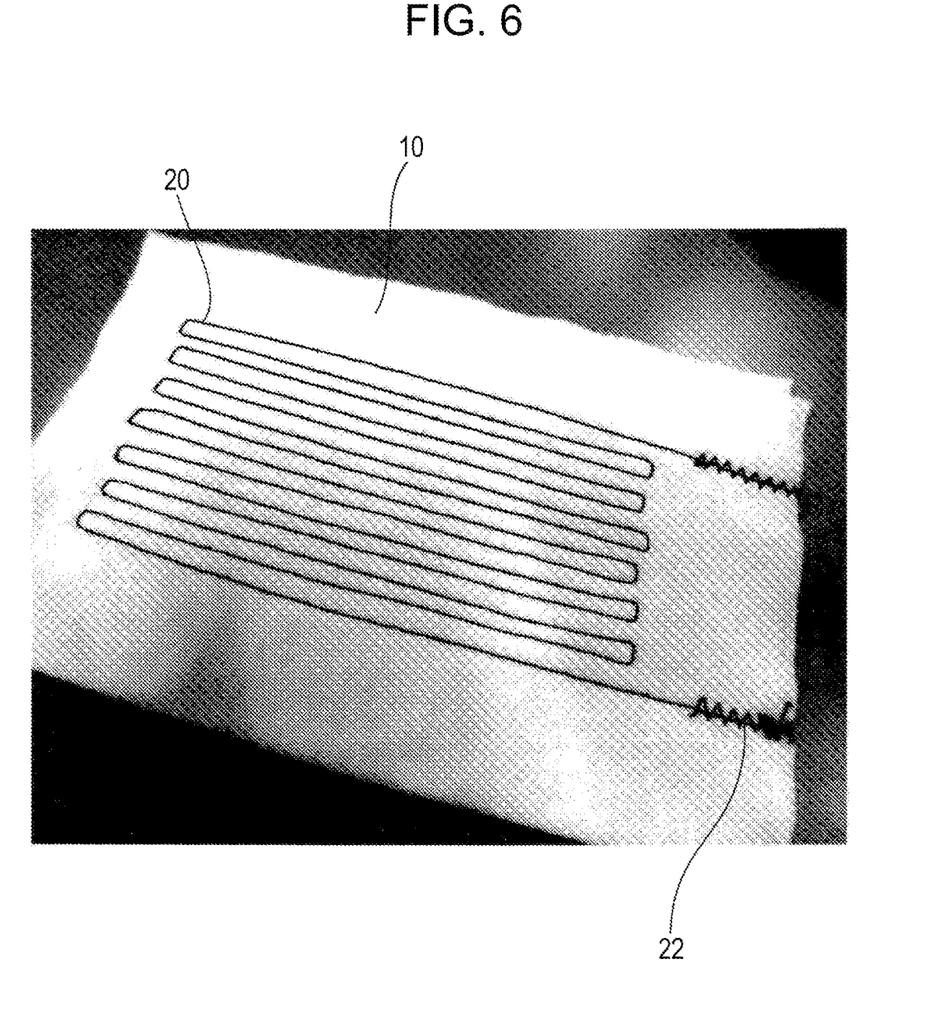
FIG. 6 is a photographic figure illustrating the flexible touch sensor according to the embodiment of the present disclosure.

FIG. 5 and FIG. 6 illustrate the flexible touch sensor 100 as an example, including the first sensor sheet 10 and a second sensor sheet 10' having the same configuration as that of the first sensor sheet 10. The second sensor sheet 10' is stacked on the first sensor sheet 10 in an orientation such that the main direction of the conductive wire on the second sensor sheet 10' is perpendicular to the conductive wire on the first sensor sheet 10. In the flexible touch sensor 100, knit cloth is used for both sensor sheets. The flexible touch sensor 100 can be used in a state where the sensor sheets are flexibly bendable and expandable/contractible like clothes. This indicates that a user interface can be embedded into an accessory such as clothes or a bag without any discomfort of a user.

Figure 7:
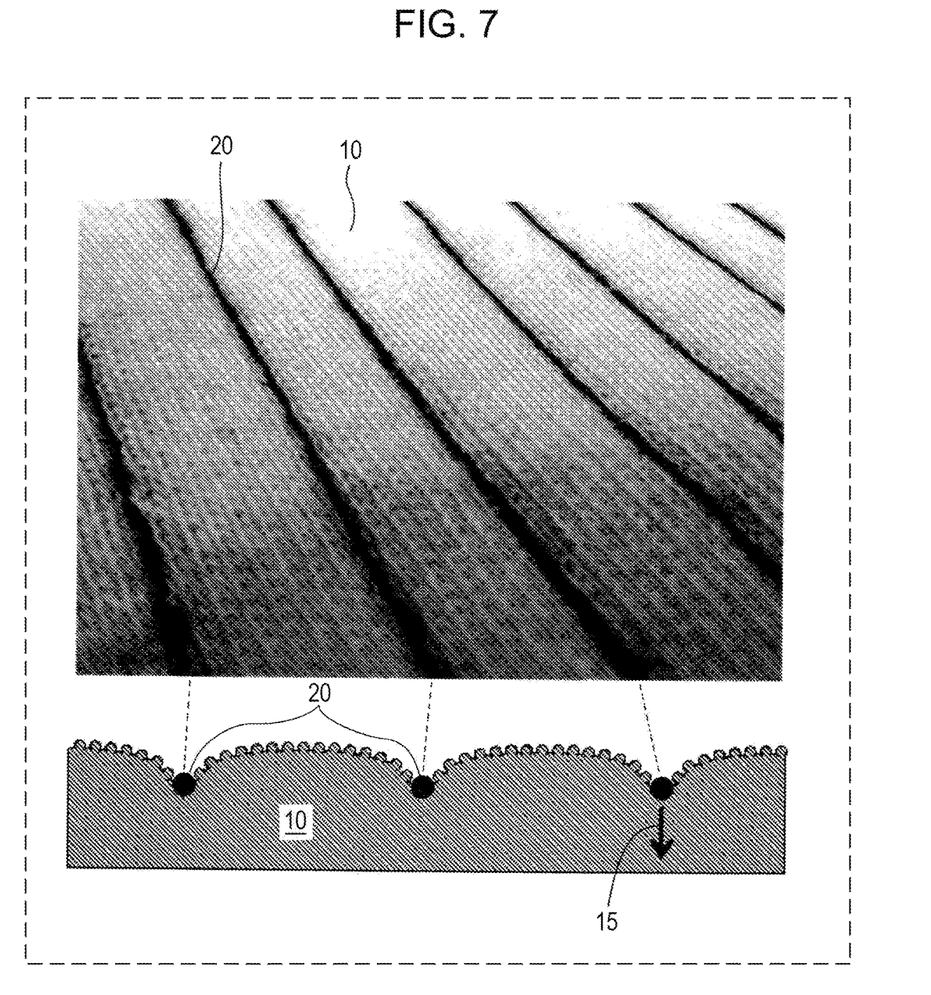
FIG. 7 illustrates a photographic view and a schematic sectional view depicting a sensor sheet of a flexible touch sensor according to an embodiment of the present disclosure.

FIG. 7 illustrates enlarged views of the first or second sensor sheet of FIG. 6. As illustrated, the sheet materials 10 and 10' have a form of fiber cloth. For instance, each of the first sensor sheet 10 and the second sensor sheet 10' is composed of a knit material in which cotton yarn is knitted, and machine sewing may be performed using a conductive twisted thread as the "top thread" and an insulating twisted thread as the "bobbin thread". Since the knit material has a cushioning property, machine sewing under a predetermined thread tension causes the conductive wire 20 to receive a drawing tension and to be sunk into the surface of the sheet base material.

In the aspect illustrated in FIG. 5 and FIG. 6, the conductive wire 20 is provided in a stripe pattern as a whole. As seen from the illustrated form, in each of the first sensor sheet 10 and the second sensor sheet 10', multiple conductive wires 20 are linearly disposed at a predetermined pitch. In this case, touch sensing is performed by detecting a signal of each conductive wire 20. As an illustration merely, the conductive wires 20 are connected continuously between adjacent linear stripes, and may assume what is called a "unicursal drawing state". Thus, the conductive wires 20 may be continuously connected and alternately turned up on the right and left. In the terminal-end portions of the conductive wire 20, a twisted thread similar to the conductive wire may be sewn in a zigzag pattern and a wire leader 22 may be provided. As seen from FIG. 5, the two sensor sheets each including a stripe-shaped conductive wire can be stacked with the stripes crossing in perpendicular directions.

Figure 8:
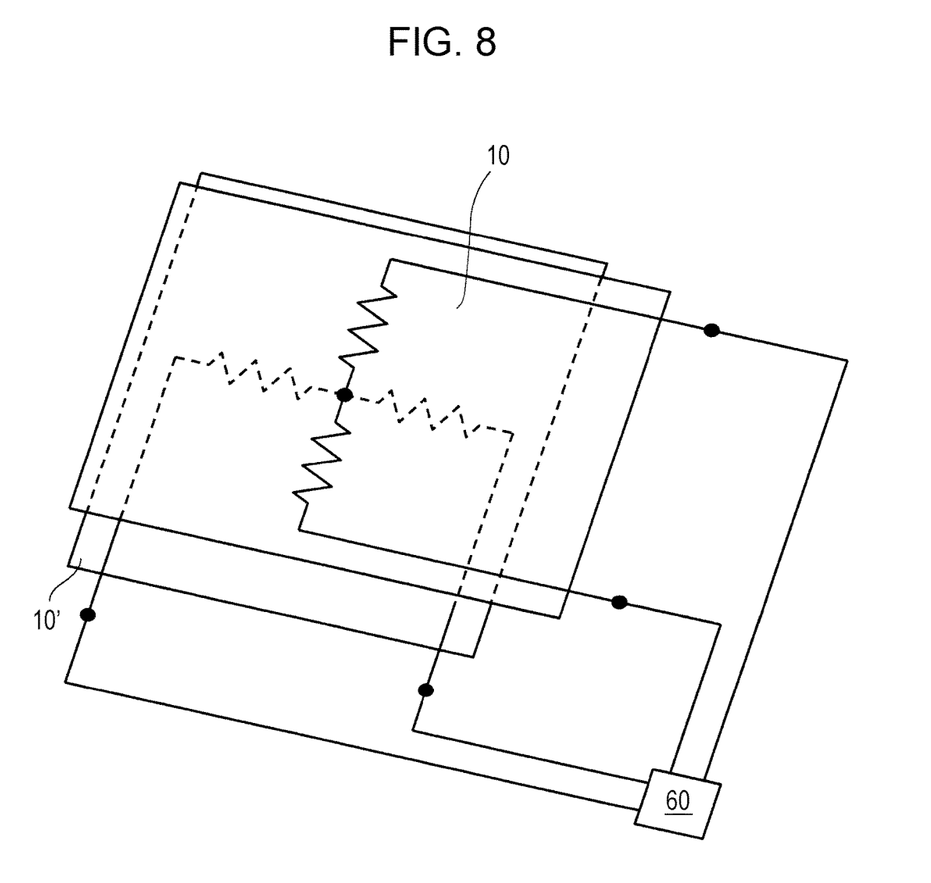
FIG. 8 is a schematic diagram illustrating the circuit configuration of a flexible touch sensor according to an embodiment of the present disclosure.
Figure 9A:
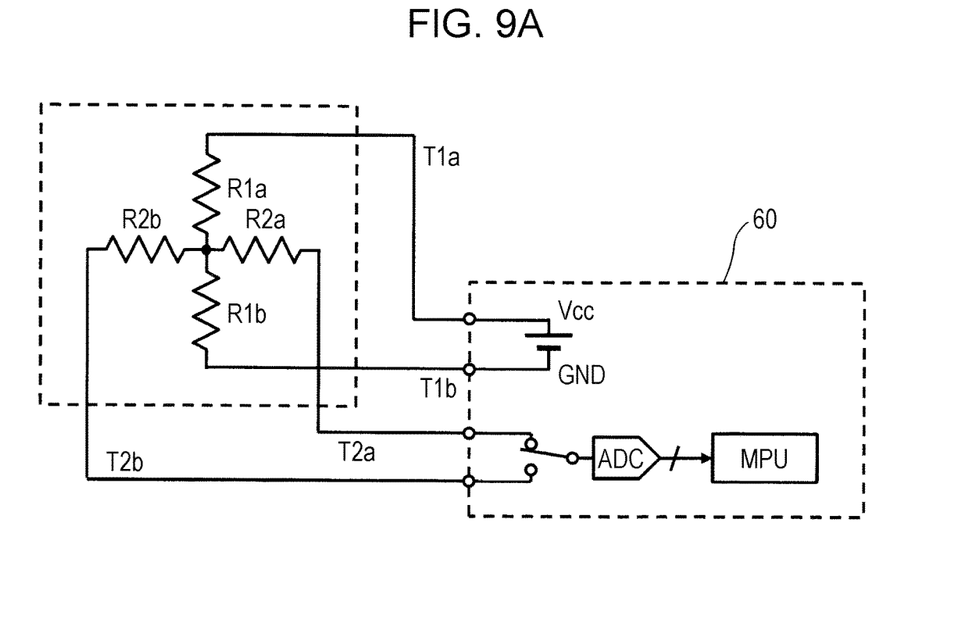
FIG. 9A is a circuit diagram illustrating the operation of a flexible touch sensor according to an embodiment of the present disclosure.
Figure 9B:
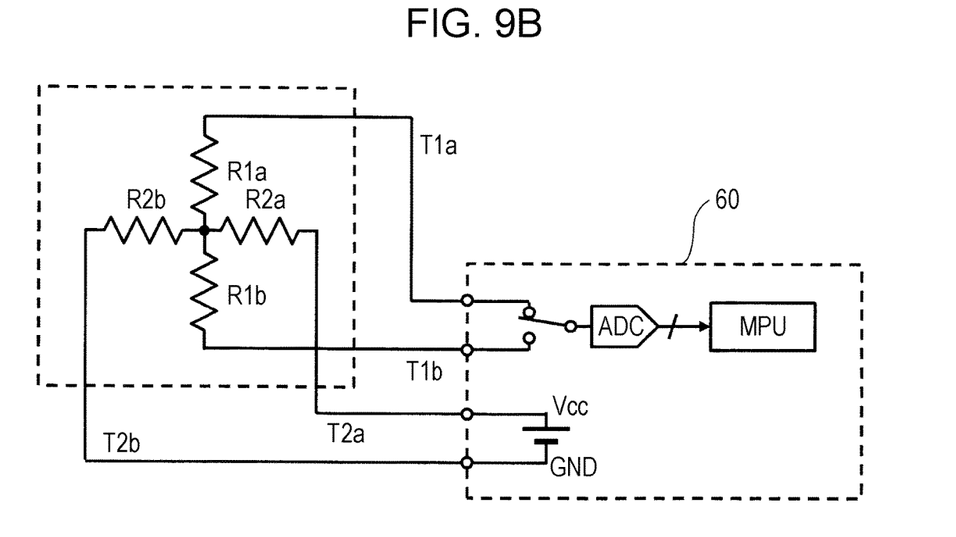
FIG. 9B is a circuit diagram illustrating the operation of the flexible touch sensor according to the embodiment of the present disclosure.

FIG. 8 and FIGS. 9A and 9B illustrate an example of a touch sensing operation in the flexible touch sensor of the present disclosure. The conductive wires of the first sensor sheet 10 and the second sensor sheet 10' each can be regarded as a resistor on a circuit diagram. Thus, the conductive wires are illustrated as divided resistors having a contact point which is an area of contact between the conductive wires of the first sensor sheet 10 and the second sensor sheet 10'.

First, as illustrated in FIG. 9A, a voltage is applied across terminals T1$a$ and T1$b$ of a signal processing circuit 60 to form a potential slope in divided resistors R1$a$ and R1$b$, and a voltage measurement circuit (for instance, an AD converter) is connected to terminal T2$a$ or T2$b$ of the signal processing circuit 60 to measure the potential of the contact point between the conductive wires. The ratio of R1$a$ to R1$b$ can be calculated by comparing the measured potential with the applied voltage Vcc, and thus the vertical position of the area of contact between the conductive wires of the first sensor sheet 10 and the second sensor sheet 10' can be determined. Next, as illustrated in FIG. 9B, the ratio of R2$a$ to R2$b$ can be similarly calculated by using the terminals of the signal processing circuit 60 in a switched manner, and thus the horizontal position of the area of contact between the conductive wires of the first sensor sheet 10 and the second sensor sheet 10' can be determined. The coordinates of a touched point are detectable by the above operation.

Figure 10:
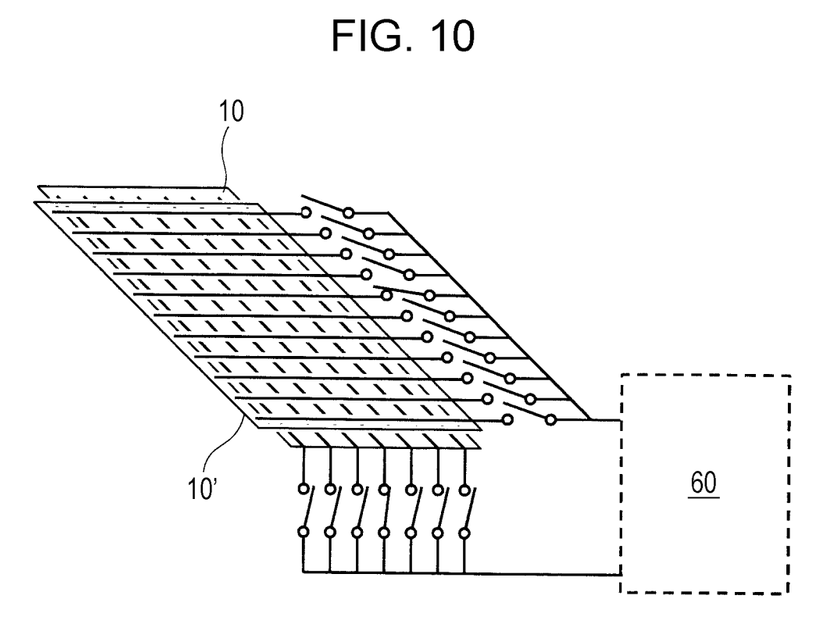
FIG. 10 is a schematic diagram illustrating the circuit configuration of a flexible touch sensor according to an embodiment of the present disclosure.

It is to be noted that although mainly a resistive touch sensor configuration has been illustrated in the above, the touch sensor configuration is not limited to this. For instance, as illustrated in FIG. 10, conductive wires are formed in a stripe pattern in the first sensor sheet 10 and the second sensor sheet 10', the first sensor sheet 10 and the second sensor sheet 10' are disposed so that stripes of the conductive wires cross perpendicular, and terminals may be pulled from stripes of the respective conductive wires of the first sensor sheet 10 and the second sensor sheet 10'. In this case, a horizontal conductive wire and a vertical conductive wire for detecting presence or absence of electrical connection are selected by a switch. Selection of a horizontal conductive wire and a vertical conductive wire is sequentially changed, and the position of a touch to the touch sensor is identified by identifying a horizontal conductive wire and a vertical conductive wire in electrical connection.

[Manufacturing Method of Flexible Touch Sensor According to Present Disclosure]

The manufacturing method of the present disclosure is a method for manufacturing the above-described flexible touch sensor. Specifically, the manufacturing method of the present disclosure is a method for manufacturing a flexible touch sensor including a cushioning sheet material and a conductive wire provided on the sheet material.

In a manufacturing method according to an embodiment, a conductive wire is pulled from the side opposite to the side of the major surface, where a conductive wire is located, of the cushioning sheet material, and the conductive wire is fixed to the cushioning sheet material. In thus obtained flexible touch sensor, the conductive wire 20 provided in the major surface 10a of the cushioning sheet material 10 has a form of being sunk into the sheet material 10 (see FIGS. 1A and 1B). In other words, the conductive wire 20 provided in the cushioning sheet material 10 has a form of digging into the major surface 10a of the sheet material 10. Thus, the conductive wire 20 is depressed inwardly of the cushioning sheet material 10.

Figure 11:
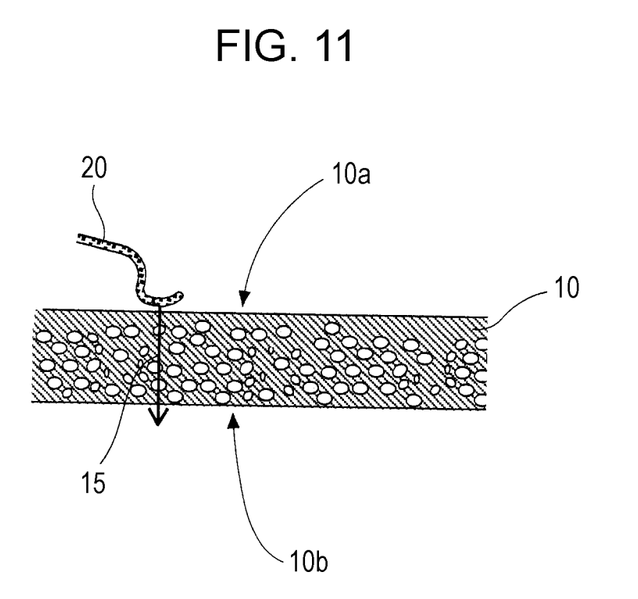
FIG. 11 is a sectional view schematically illustrating an aspect of a manufacturing method according to an embodiment of the present disclosure.

In the manufacturing method of the present disclosure, as illustrated in FIG. 11, one of the major surfaces of the cushioning sheet material 10 is the major surface 10a on a side where a conductive wire is supplied, and the other major surface is the major surface 10b on a side where a conductive wire is pulled. As seen from the aspect illustrated in FIG. 11, the conductive wire 20 is supplied from the side of the major surface 10a, and the pulling force 15 is applied from the side of the major surface 10b to the conductive wire 20 with the intervening cushioning sheet material 10. Thus, the conductive wire 20 is provided on the major surface 10a of the cushioning sheet material 10. The sheet material 10 has the "cushioning property". Thus, the major surface 10a is deformed by the stress received from the conductive wire 20 which is pulled. In particular, the major surface 10a is locally dented at the installation position of the conductive wire 20. Consequently, the conductive wire 20 has a form of being sunk into the sheet material 10 on the major surface 10a of the cushioning sheet material 10 (see FIGS. 1A and 1B).

In the major surface 10a of the cushioning sheet material 10, the installation position of the conductive wire 20 and its vicinity area are displaced to be locally dented, whereas the other area is not particularly displaced. Therefore, when the height level of the major surface area where a conductive wire is disposed is compared with the height level of the other major surface area, the height level of the latter major surface area (that is, the area where no conductive wire is disposed) is higher. In other words, in the manufacturing method of the present disclosure, the conductive wire is pulled more to the sheet side, and the conductive wire is thereby disposed at a lower level (particularly, a level lower than the highest level among the height levels of the major surface of the cushioning sheet material 10).

In the manufacturing method of the present disclosure, the conductive wire may be locally pulled at multiple positions of the conductive wire. That is, the conductive wire may be locally pulled at multiple points of the conductive wire. For instance, a conductive wire 20 supplied from the side of the major surface 10a may be pulled (particularly pulled with the intervening cushioning sheet material 10) successively from the side of the major surface 10b. Thus, the height level of the conductive wire 20 sunk into the major surface 10a of the cushioning sheet material 10 can be periodically changed. More specifically, as illustrated in FIG. 1B, the conductive wire can be extended so that the first lower level $H_1$ and the second lower level $H_2$ are alternately positioned.

The fixing wire 30 may be used to pull the conductive wire (see FIGS. 2A and 2B). In this case, a fixing wire is supplied on the major surface 10b on the side from which a conductive wire is pulled. The fixing wire is engaged with the conductive wire, and the conductive wire may be pulled by the fixing wire. In other words, a fixing wire supplied from the side opposite to the side of the major surface, where a conductive wire is located, of the cushioning sheet material, is engaged with the conductive wire, and the conductive wire may be pulled by the fixing wire. For appropriate engagement between the conductive wire and the fixing wire, a sewing needle may be utilized. When the fixing wire 30 is used, the drawing tension 15 in a direction to the center of the cushioning sheet material 10 can be applied to the conductive wire 20 by the tension (see FIG. 2A and FIG. 2B). Here, since the cushioning sheet material 10 has a "cushioning property", the conductive wire 20 has a form of being sunk inwardly of the sheet material 10 due to the drawing tension 15.

As an illustration merely, the engagement of the fixing wire with the conductive wire may be made by what is called "machine sewing". For instance, the conductive wire may be regarded as the top thread and the fixing wire may be regarded as the bobbin thread, and such top thread and bobbin thread may be engaged with each other by machine sewing. In other words, the conductive wire may be fixed to the cushioning sheet material by machine sewing of the conductive wire into the cushioning sheet material. In this case, since the conductive wire can be disposed by a method of machine sewing, it is possible to manufacture the flexible touch sensor relatively fast and easily.

In addition, it is likely to obtain a desired flexible touch sensor by adjusting factors such as a sewing pitch, a sewing speed of the "machine sewing" as needed. As an illustration merely, for instance, when the sewing pitch is narrowed or reduced, the conductive wire is likely to have a form of being sunk into the cushioning sheet material. As a result, an insulated state (in other words, an insulated state at the time of no-touch operation) of the stacked sheets is achieved appropriately.

In the manufacturing method of the present disclosure, a wire with flexibility may be used as a conductive wire. Specifically, the conductive wire itself may be bent in a curved shape or bent sharply according to an external force. Thus, drawing tension caused by the fixing wire can be properly transmitted to the conductive wire, and the conductive wire drawn inwardly of the cushioning sheet material is likely to have a form of being sunk into the sheet material.

Also, in the manufacturing method of the present disclosure, as the cushioning sheet material, a sheet material including a sponge material, a fiber cloth material or an elastomer material may be used. Such a sheet material is flexible as a whole and can be properly deformed by a pressing force, and thus when a conductive wire is installed in the major surface of the cushioning sheet material, the conductive wire is likely to have a form of being sunk into the sheet material. Also, such a sheet material may exhibit not only the "cushioning property" but also "flexibility". This is because with the flexibility, it is possible to obtain a flexible touch sensor in which the cushioning sheet material is bendable as a whole according to an external force and which is more properly fitted to the surface of a human body or a curved surface of an object.

Other various matters related to the manufacturing method of the present disclosure have been described in the [Flexible Touch Sensor according to Present Disclosure], a description is omitted to avoid redundancy.

The sensor of the present disclosure is a flexible touch sensor. In particular, the touch sensor of the present disclosure is usable in a bent form, and can serve as a user interface that is fitted to the surface of a human body or a curved surface of an object. Although the flexible touch sensor of the present disclosure and the manufacturing method of the flexible touch sensor have been described in the above, the present disclosure is limited to this, and it should be understood that various modifications may be made by those skilled in the art without departing from the scope of the disclosure defined in the appended claims.

For instance, the flexible touch sensor of the present disclosure also allows capacitive touch sensing to be performed. Specifically, since the first sensor sheet and the second sensor sheet can be stably separated, an electrical capacitance between the conductive wire of the first sensor sheet and the conductive wire of the second sensor sheet may be measured at the time of sensing. That is, touch sensing can be performed by reading a change in the electrical capacitance in a state where a finger or the like is close to the sensor sheet until being pressed down. Also when the flexible touch sensor is touched, the conductive wire disposed in the first sheet material and the conductive material of the second sheet material do not have to come into direct contact. For instance, a dielectric layer may be provided between the first sheet material and the second sheet material, and the conductive wire and the conductive material may be separated. In this case, a touch to the flexible touch sensor is detectable by detecting a change in the electrical capacitor between the conductive wire and the conductive material using a detection circuit.

The flexible touch sensor of the present disclosure can be utilized not only in the category of the field of electronic devices, but also in the field of wearable devices, the field of health care, the field of medicine and the field of nursing care. For instance, the flexible touch sensor of the present disclosure can be utilized as a user interface such as a wearable device, for which expansion and contraction or flexible deformation according to movement of a human body are called for. In this case, even when flexibly deformed, the touch sensor fulfills the function thereof without malfunction, and can serve as a touch sensor effective for business operation assistance application, such as a device operation with hands free.

Also, the flexible touch sensor of the present disclosure may be used in an area with which a human body comes into contact, for instance, a sensor is embedded in a sheet to monitor a change in body posture for bedsore prevention in a care bed, or a sensor is embedded in a sheet of an automobile to monitor a state of a human body. Consequently, a user interface fitted to the surface of a human body or movement of a human body without any discomfort can be achieved. For instance, a device to be operated by a human in a direct touch manner other than wearable devices, for instance, the steering wheel of an automobile has a curved surface in a shape fitted to human hands, and thus when the flexible touch sensor is incorporated in the curved surface of such an object, an interface, which is operable while the steering wheel is being held, can also be achieved.

What is claimed is:

1. A flexible touch sensor comprising:
   a first sheet material that has a first major surface, and that has a cushioning property;
   a second sheet material that includes a conductive material, and that is disposed on the first major surface of the first sheet material; and
   a conductive wire that is disposed on the first major surface of the first sheet material, and that is sunk into the first sheet material, wherein
   the first major surface of the first sheet material has a plurality of height levels,
   the plurality of height levels include a first level and a second level lower than the first level,
   the conductive wire is disposed at the second level,
   the second level includes a third level and a fourth level lower than the third level,
   the conductive wire includes a third part disposed at the third level and a fourth part disposed at the fourth level, and
   the third part and the fourth part are alternately disposed in a longitudinal direction of the conductive wire.

2. The flexible touch sensor according to claim 1, wherein the first sheet material includes a first part on which the conductive wire is not disposed, and a second part on which the conductive wire is disposed, and
   in a state where the flexible touch sensor is not pressed, the first part is in contact with the second sheet material, the second part is apart from the second sheet material, and the second part is more compressed than the first part.

3. The flexible touch sensor according to claim 1, further comprising
   a fixing wire that is engaged with the conductive wire and causes the conductive wire to be sunk into the first sheet material.

4. The flexible touch sensor according to claim 1, further comprising
   a fixing wire that is engaged with the conductive wire at a position at the fourth level or lower and causes the conductive wire to be sunk into the first sheet material.

5. The flexible touch sensor according to claim 1, wherein the conductive wire has flexibility.

6. The flexible touch sensor according to claim 1, wherein the conductive wire includes a metal material or a conductive fiber material.

7. The flexible touch sensor according to claim 3, wherein a type of the conductive wire is same as a type of the fixing wire.

8. The flexible touch sensor according to claim 3, wherein the fixing wire is an insulating wire.

9. The flexible touch sensor according to claim 1, wherein the first sheet material includes a sponge material, a fiber cloth material or an elastomer material.

10. The flexible touch sensor according to claim 1, wherein the first sheet material has flexibility.

11. The flexible touch sensor according to claim 1,
wherein the second sheet material has a cushioning property, and has a second major surface facing the first major surface, and
the conductive material is a second conductive wire that is disposed on the second major surface of the second sheet material, and that is sunk into the second sheet material.

12. The flexible touch sensor according to claim 1,
the second sheet material is disposed directly on the first major surface of the first sheet material.

13. A method of manufacturing a flexible touch sensor that includes:
a first sheet material that has a first major surface and a third major surface on an opposite side to the first major surface, and that has a cushioning property,
a second sheet material that includes a conductive material, and that is disposed on the first major surface of the first sheet material, and
a conductive wire that is disposed on the first major surface of the first sheet material, and that is sunk into the first sheet material,
the method comprising
pulling the conductive wire from the third major surface, and sinking the conductive wire onto the first major surface inwardly of the first sheet material, and
causing the second sheet material to be located on the first sheet material.

14. The method of manufacturing a flexible touch sensor according to claim 13,
wherein due to the pulling of the conductive wire, a plurality of height levels including a first level and a second level lower than the first level are formed in the first major surface, and the conductive wire is disposed at the second level.

15. The method of manufacturing a flexible touch sensor according to claim 13,
wherein the pulling of the conductive wire is performed locally at a plurality of positions of the conductive wire.

16. The method of manufacturing a flexible touch sensor according to claim 13,
wherein in the pulling, a fixing wire supplied from the third major surface is engaged with the conductive wire and the conductive wire is pulled by the fixing wire.

17. The method of manufacturing a flexible touch sensor according to claim 13,
wherein as the first sheet material, a sheet material including a sponge material, a fiber cloth material, or an elastomer material is used.

18. The method of manufacturing a flexible touch sensor according to claim 13,
wherein the conductive wire is fixed to the first sheet material by machine-sewing the conductive wire into the first sheet material.

\* \* \* \* \*